United States Patent
Reimer

(10) Patent No.: US 11,915,242 B2
(45) Date of Patent: Feb. 27, 2024

(54) PREMISES SECURITY SYSTEM WITH SECURE EMBEDDED CRYPTOCURRENCY STORAGE

(71) Applicant: The ADT Security Corporation, Boca Raton, FL (US)

(72) Inventor: Mark Reimer, Denver, CO (US)

(73) Assignee: The ADT Security Corporation, Boca Raton, FL (US)

( * ) Notice: Subject to any disclaimer, the term of this patent is extended or adjusted under 35 U.S.C. 154(b) by 0 days.

(21) Appl. No.: 18/061,169

(22) Filed: Dec. 2, 2022

(65) Prior Publication Data

US 2023/0214835 A1 Jul. 6, 2023

Related U.S. Application Data

(60) Provisional application No. 63/295,206, filed on Dec. 30, 2021.

(51) Int. Cl.
*G06Q 20/40* (2012.01)
*G06Q 20/36* (2012.01)
*G06Q 20/38* (2012.01)

(52) U.S. Cl.
CPC ......... *G06Q 20/4012* (2013.01); *G06Q 20/36* (2013.01); *G06Q 20/3829* (2013.01)

(58) Field of Classification Search
CPC . G06Q 20/4012; G06Q 20/36; G06Q 20/3829
See application file for complete search history.

(56) References Cited

U.S. PATENT DOCUMENTS

| | | |
|---|---|---|
| 11,133,984 B2 | 9/2021 | Newell et al. |
| 2017/0206523 A1 | 7/2017 | Goeringer et al. |
| 2018/0181946 A1* | 6/2018 | Miryala ................ G06T 19/006 |
| 2018/0254905 A1* | 9/2018 | Chun .................... H04L 9/3273 |
| 2018/0337769 A1 | 11/2018 | Gleichauf |
| 2019/0019179 A1* | 1/2019 | Mtaza ................ G06Q 20/4016 |
| 2019/0251552 A1* | 8/2019 | Kurian .................. H04L 9/3247 |
| 2020/0013051 A1* | 1/2020 | Kadiwala .............. H04L 63/068 |
| 2020/0342424 A1* | 10/2020 | Friedlander ............ G06Q 20/18 |
| 2021/0334792 A1* | 10/2021 | Kalaboukis ............ G06Q 40/02 |

FOREIGN PATENT DOCUMENTS

| | | | |
|---|---|---|---|
| EP | 3355225 A1 | 8/2018 | |
| WO | WO-9933222 A1 * | 7/1999 | ......... G06F 21/6245 |
| WO | 2020142179 A1 | 7/2020 | |

* cited by examiner

*Primary Examiner* — Jacob C. Coppola
*Assistant Examiner* — Christine Dang
(74) *Attorney, Agent, or Firm* — Christopher & Weisberg, P.A.

(57) ABSTRACT

A cryptocurrency management device configurable to communicate with a security system base station is described. The cryptocurrency management device comprises processing circuitry configured to receive a personal identification number (PIN) from the security system base station; provide access to a cryptocurrency wallet based on the PIN; and perform a cryptocurrency transaction associated with the cryptocurrency wallet subsequent to providing access to the cryptocurrency wallet.

20 Claims, 10 Drawing Sheets

PREMISES SECURITY SYSTEM WITH SECURE EMBEDDED CRYPTOCURRENCY STORAGE

CROSS-REFERENCE TO RELATED PATENT APPLICATION

This application is related to and claims priority to U.S. Provisional Patent Application Ser. No. 63/295,206, filed Dec. 30, 2021, entitled PREMISES SECURITY SYSTEM WITH SECURE EMBEDDED CRYPTOCURRENCY STORAGE, the entirety of which is incorporated herein by reference.

TECHNICAL FIELD

This disclosure relates to a premises security system and in particular to a method, apparatus, and system for implementing and using a cryptocurrency wallet in the premises security system.

BACKGROUND

Decentralized finance (DeFi) is a global, open alternative to traditional, tightly-controlled financial systems. DeFi is rooted in transparency and leverages open-source technology to facilitate secure, local or international financial transactions and is experiencing tremendous growth. As more and more people start participating in DeFi using cryptocurrencies, safe ways to store digital money, i.e., cryptocurrency, is demanded. One way to secure cryptocurrency is to store the cryptocurrency in a cryptocurrency wallet that is stored on a personal computer or mobile phone.

Since a cryptocurrency wallet is similar to a wallet with cash, cyberattacks are turning to hacking and/or gaining access to cryptocurrency wallets. Over the past several years, cyberattacks have increased significantly on cryptocurrency wallets and exchanges. For example, it has been estimated that cryptocurrency exchanges suffered a total loss of $882 million due to targeted attacks in 2017 and in the first three quarters of 2018.

BRIEF DESCRIPTION OF THE DRAWINGS

A more complete understanding of embodiments described herein, and the attendant advantages and features thereof, will be more readily understood by reference to the following detailed description when considered in conjunction with the accompanying drawings wherein.

DETAILED DESCRIPTION

Figure 1:
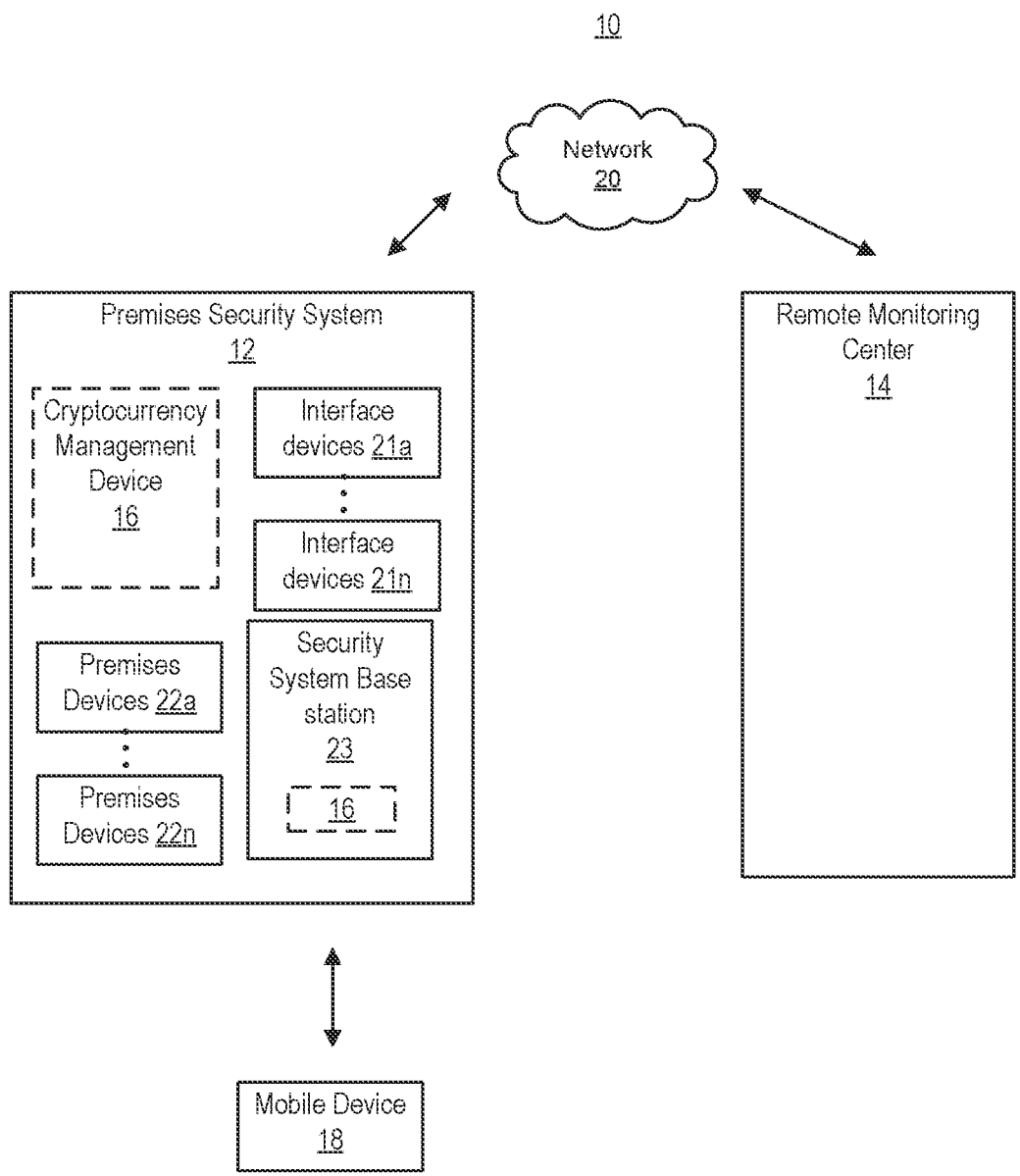
FIG. 1 is a diagram of a security system comprising an example premises security system with an embedded cryptocurrency management device in accordance with some embodiments.

The present disclosure relates to providing DeFi consumers with a low complexity and secure process to protect DeFi money (e.g., cryptocurrency). The process may implement security practices with professional monitoring and protection from cyber-attacks.

Some embodiments advantageously provide a method, apparatus, and system for a premises security system with a secure, embedded hardware-based cryptocurrency wallet. Hardware wallets (e.g., referred to as cold wallets when they are disconnected from the internet) provide a strong security measure when someone wants to secure a cryptocurrency, such as a large amount of cryptocurrency. Online or mobile wallets are often used in conjunction with hardware wallets. A mobile wallet may be thought of as the wallet and cash carried by a person. Generally, people carry a relatively small amount of cash on them, and not their life savings. Thus, a hardware wallet may be thought of as a bank or safety deposit box for safeguarding and storing large amounts of cryptocurrency.

By embedding a hardware-based cryptocurrency wallet into a premises security system, users of the hardware-based cryptocurrency wallet receive the benefits of a more secure mechanism for storing cryptocurrency. Further, the embedded hardware-based cryptocurrency wallet may alleviate the need to purchase, configure, and use a separate hardware wallet. In some embodiments, the hardware-based cryptocurrency wallet allows cryptocurrency to be held by the individual, not an institution that can control or block access and provides a much more secure way of storing cryptocurrency (as compared with online wallets or mobile wallets). Further, hardware-based cryptocurrency wallet may be physically located in the customer's home or business, monitored by the premises security system, and maintained and monitored by security provider. In addition, a hardware-based cryptocurrency wallet protects against compromised networks (e.g., Wi-Fi networks), unsecured computers, malware, and keyloggers.

Before describing in detail example embodiments, it is noted that the embodiments reside primarily in combinations of apparatus components and processing steps related to embedding a cryptocurrency wallet in a security system such as a premises security system. Accordingly, the system and method components have been represented where appropriate by conventional symbols in the drawings, focusing on only those specific details that facilitate understanding the embodiments of the present disclosure so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In some embodiments, the term personal identification number (PIN) may be used, which may refer to any number or character or string or combination thereof. A PIN may be secret (i.e., private to a user) and may be used to grant access to a cryptocurrency wallet or security system functions or any other functions.

The term "wallet" may refer to a cryptocurrency wallet (or cryptocurrency wallet). A cryptocurrency wallet may refer to software and hardware configured for performing cryptocurrency transactions such as transferring or storing cryptocurrency. A cryptocurrency wallet may transfer or store information associated with cryptocurrency or users associated with cryptocurrency. A cryptocurrency wallet may include one or more components which may be comprised in a cryptocurrency management device.

Unless otherwise defined, all terms (including technical and scientific terms) used herein have the same meaning as commonly understood by one of ordinary skill in the art to which this disclosure belongs. Terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Referring to the drawing figures, in which like elements are referred to by like reference numerals, there is shown in FIG. 1 a diagram of a system 10 comprising an example premises security system 12 comprising a cryptocurrency management device 16 (e.g., an embedded cryptocurrency management device) in accordance with some embodiments. System 10 includes premises security system 12 in communication with mobile device 18 and remote monitoring center 14 through network 20. In one or more embodiments, system 10 includes a cryptocurrency management device 16 configured to implement the functionality of a cryptocurrency wallet.

Premises security system 12 includes and/or is associated with one or more user interface devices 21a to 21n (collectively referred to as "user interface device 21"), one or more premises devices 22a to 22n (collectively referred to as "premises device 22"), and security system base station 23.

User interface device 21 may be a wireless device, such as a mobile device 18, that allows a user to communicate with security system base station 23. User interface device 21 may be an input interface (e.g., a keypad), a portable control keypad and/or interface, computer, mobile phone and tablet, among other devices that allow a user to interface with security system base station 23 and/or one or more premises devices 22. User interface device 21 may communicate at least with security system base station 23 using one or more wired and/or wireless communication protocols well known to those of ordinary skill in the art. For example, user interface device 21 may communicate with security system base station 23 via a ZigBee based communication link, e.g., network based on Institute of Electrical and Electronics Engineers (IEEE) 802.15.4 protocols, and/or Z-wave based communication link, or over the premises local area network, e.g., network-based on Institute of Electrical and Electronics Engineers (IEEE) 802.11 protocols, user interface device 21.

Premises devices 22 may include one or more types of sensors, control and/or image capture devices. For example, the types of sensors may include various safety related sensors such as motion sensors, infrared sensors, fire sensors, heat sensors, carbon monoxide sensors, flooding sensors and contact sensors, among other sensor types that are known in the art. The premises devices 22 may include, for example, one or more lifestyle (e.g., home automation) related devices configured to adjust at least one premises setting, such as lighting, temperature, energy usage, door lock and power settings, among other settings associated with the premises or devices on the premises. Image capture devices may include a digital camera and/or video camera, among other image captures devices. Premises device 22 may communicate with security system base station 23 via proprietary wireless communication protocols and may also use Wi-Fi, both of which are known in the art. Other communication technologies can also be used, and the use of Wi-Fi is one example. Those of ordinary skill in the art will also appreciate that various additional sensors and control and/or image capture devices may relate to life safety or lifestyle depending on both what the sensors, control and image capture devices do and how these sensors, control and image devices are used by premises security system 12.

Security system base station 23 may provide one or more of management functions and monitoring functions, analysis functions, cryptocurrency functions, security functions, control functions, such as power management, premises device management, alarm management, and/or alarm management analysis, among other functions associated with premises security system 12. Security system base station 23 may manage one or more life safety and lifestyle features. Life safety features may correspond to security system functions and settings associated with premises conditions that may result in life threatening harm to a person, such as carbon monoxide detection and intrusion detection. Lifestyle features may correspond to security system functions and settings associated with video capturing devices and non-life-threatening conditions of the premises such as lighting and thermostat functions. In one or more embodiments, security system base station 23 may include cryptocurrency management device 16. In one or more embodiments, cryptocurrency management device 16 is a device separate from security system base station 23, and/or removably pluggable into security system base station 23.

Security system base station 23 may communicate with network 20 via one or more communication links. In particular, the communications links may be broadband communication links, such as a wired cable modem or Ethernet communication link, and digital cellular communication link, e.g., long term evolution (LTE) and/or 5G based link, among other broadband communication links. Broadband as used herein may refer to a communication link other than a plain old telephone service (POTS) line. Ethernet communication link may be an IEEE 802.3 or 802.11 based communication link. Network 20 may be a wide area network, local area network, wireless local network and metropolitan area network, among other networks. Network 20 may be configured to provide communication between premises security system 12 (e.g., including security system base station 23 and cryptocurrency management device 16) and remote monitoring center 14. Further, network 20 may be configured to provide communication between premises security system 12 (e.g., including security system base station 23 and cryptocurrency management device 16) and to a public blockchain network. In one or more embodiments, security system base station 23 may be part of premises device 22 or interface device 21.

While security system base station 23 is illustrated as being a separate device from user interface device 21 and premises device 22, in one or more embodiments, security system base station 23 may be integrated with one or more user interface devices 21 and/or premises devices 22 and/or other entity and/or device located at premises associated with premises security system 12.

Figure 2:
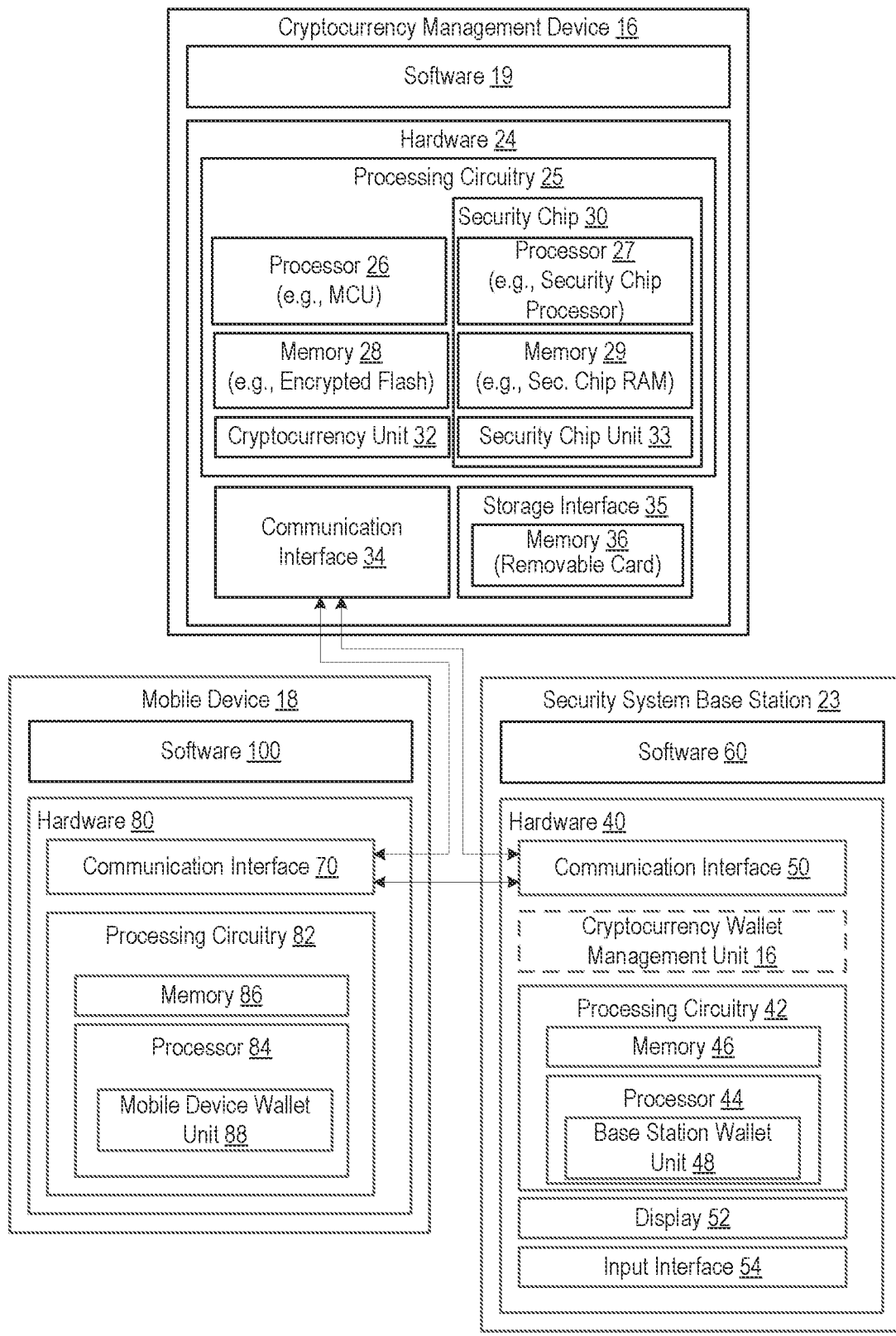
FIG. 2 is a diagram of an example of some entities in the system in accordance with some embodiments.

FIG. 2 is a diagram of an example block diagram of system 10 comprising cryptocurrency management device 16, mobile device 18, and security system base station 23. In one or more embodiments, cryptocurrency management device 16 includes hardware 24 and software 19 where cryptocurrency management device 16 may be embedded in premises security system 12 but is not limited a such and may be standalone. Cryptocurrency management device 16 may include hardware 24 comprising communication interface 34 and processing circuitry 25. The processing circuitry 25 may include a processor 26 and a memory 28. In particular, in addition to or instead of a processor, such as a central processing unit, and memory, the processing circuitry 25 may comprise integrated circuitry for processing and/or control, e.g., one or more processors, processor cores, field programmable gate arrays (FPGAs), application specific integrated circuits (ASICs), and/or microcontrollers adapted to execute instructions. The processor 26 may be configured to access (e.g., write to and/or read from) the memory 28, which may comprise any kind of volatile and/or nonvolatile memory, e.g., cache and/or buffer memory and/or random access memory (RAM), read-only memory (ROM), optical memory, and/or erasable programmable read-only memory (EPROM). Further, memory 28 may be configured as a storage device.

Memory 28 may comprise software 19 (which may include cryptocurrency management device application software) stored internally in, for example, memory 28, or stored in external memory (e.g., database, storage array, network storage device, etc.) accessible by the cryptocurrency management device 16 via an external connection. Cryptocurrency management device application software may include any software and/or program configured to perform the steps and/or processes of the present disclosure, e.g., providing an interface for a user to provide an input to the cryptocurrency management device 16 and/or receive an output from cryptocurrency management device 16. Further, one or more software applications may run and/or be included directly as part of software 19 and/or cryptocurrency management device 16. Software 19 may be virtualized and/or running outside cryptocurrency management device 16 and/or any of the components of cryptocurrency management device 16.

The processing circuitry 25 and communication interface 34 control any of methods and/or processes described herein and/or to cause such methods, and/or processes to be performed, e.g., cryptocurrency management device 16. Further, communication interface 34 may be configured to establish, maintain, or terminate communication with any component of system 10 (e.g., mobile device 18, security system base station 23, etc.). Communication interface 34 may be configured to support any communication protocol, use private communication links, semi-private communication links, and public communication links.

In some embodiments, the software 19 in memory 28 may include instructions that, when executed by the processor 26 and/or processing circuitry 25, cause the processor 26 and/or processing circuitry 25 to configure the cryptocurrency management device 16 to provide a cryptocurrency wallet (or cryptocurrency wallet functions) in the premises security system 12.

Further, hardware 24 may comprise cryptocurrency unit 32 configured to perform any step and/or task and/or process and/or method and/or feature described in the present disclosure, e.g., provide, maintain, or terminate access to a cryptocurrency wallet, perform one or more steps associated with a cryptocurrency wallet function, perform one or more steps associated with implementing a trusted execution environment (TEE), which may provide hardware isolation and protections for software application such as security and cryptocurrency applications.

Hardware 24 may comprise security chip 30 (e.g., a system on a chip (SoC)), which may be configured to perform one or more steps for providing security of the cryptocurrency hardware wallet. Security chip 30 may comprise processor 27 (e.g., security chip processor), memory 29 (e.g., security chip RAM), and security chip unit 33. In particular, in addition to or instead of a processor, such as a central processing unit, and memory, the processing circuitry 25 may comprise integrated circuitry for processing and/or control, e.g., one or more processors, processor cores, FPGAs, ASICs, and/or microcontrollers adapted to execute instructions. The processor 27 may be configured to access (e.g., write to and/or read from) the memory 29 or any other memory of cryptocurrency management device 16, which may comprise any kind of volatile and/or nonvolatile memory, e.g., cache and/or buffer memory, RAM, ROM, optical memory, and/or EPROM. Further, memory 29 may be configured as a storage device.

Memory 29 may comprise software 19 (which may include security chip application software) stored internally in, for example, memory 29, or stored in external memory (e.g., database, storage array, network storage device, etc.) accessible by the cryptocurrency management device 16 via an external connection. Cryptocurrency management device application software may include any software and/or program configured to perform the steps and/or processes of the present disclosure, e.g., providing an interface for a user to provide an input to the cryptocurrency management device 16 and/or receive an output from cryptocurrency management device 16. Further, one or more software applications may run and/or be included directly as part of software 19 and/or cryptocurrency management device 16. Software 19 (e.g., comprised in memory 29) may be virtualized and/or running outside cryptocurrency management device 16 and/or any of the components of cryptocurrency management device 16.

Security chip unit 33 may be configured to perform any step and/or task and/or process and/or method and/or feature described in the present disclosure, e.g., provide, maintain, or terminate access to a cryptocurrency wallet, perform one or more steps associated with a cryptocurrency wallet function, provide security for the cryptocurrency hardware wallet, etc.

In addition, hardware 24 may comprise storage interface 35 (e.g., a memory card interface), which may configure to receive and communicate with memory 36 (e.g., removable memory card such as a non-volatile flash memory card). Memory 36 may be configured to store software such as software 19 (e.g., including files, private keys, public keys, secrets, personal identification numbers, etc.)

In some embodiments, software 19 may include software 19*a*, software 19*b*, software 19*c*. In one nonlimiting example, software 19*a* (e.g., wallet firmware) may be stored in and executable from memory 28 (e.g., encrypted flash memory), software 19*b* (e.g., private key, security chip software, etc.) may be stored in and executable from memory 29 (e.g., SoC RAM), and software 19*c* (e.g., private keys) may be stored in and executable from memory 36 (e.g., removable card) via storage interface 35.

Security system base station 23 comprises hardware 40 that further includes processing circuitry 42. The processing circuitry 42 may include a processor 44 and a memory 46. In particular, in addition to or instead of a processor, such as a central processing unit, and memory, the processing circuitry 38 may comprise integrated circuitry for processing and/or control, e.g., one or more processors and/or processor cores and/or field programmable gate array (FPGAs) and/or application specific integrated Circuitry (ASICs) and/or microcontroller adapted to execute instructions. The processor 44 may be configured to access (e.g., write to and/or read from) the memory 46, which may comprise any kind of volatile and/or nonvolatile memory, e.g., cache and/or buffer memory and/or random access memory (RAM) and/or read-only memory (ROM) and/or optical memory and/or erasable programmable read-only memory (EPROM).

Thus, the security system base station 23 further has software 60 stored internally in, for example, memory 46, or stored in external memory (e.g., database, storage array, network storage device, etc.) accessible by the security system base station 23 via an external connection. The software 60 may be executable by the processing circuitry 42. The processing circuitry 42 may be configured to control any of the methods and/or processes described herein and/or to cause such methods, and/or processes to be performed, e.g., by security system base station 23. Processor 44 corresponds to one or more processors 44 for performing security system base station 23 functions described herein. The memory 46 is configured to store data, programmatic software code and/or other information described herein. In some embodiments, the software 60 may include instructions that, when executed by the processor 44 and/or processing circuitry 42, causes the processor 44 and/or processing circuitry 42 to perform the processes described herein with respect to security system base station 23. In one or more embodiments, security system base station 23 includes cryptocurrency management device 16 as described above.

Further, hardware 40 may comprise communication interface 50 configured to establish, maintain, or terminate communication with any component of system 10 (e.g., cryptocurrency management device 16, mobile device 18, etc.). Communication interface 50 may be configured to support any communication protocol, use private communication links, semi-private communication links, and public communication links.

Hardware 40 may comprise base station wallet unit 48 which may be configured to perform any step and/or task and/or process and/or method and/or feature described in the present disclosure, e.g., provide, maintain, or terminate access to a cryptocurrency wallet, perform one or more steps associated with a cryptocurrency wallet function, perform one or more steps associated with communication with mobile device 18, cause transmission or reception of messages (e.g., via private network) associated with cryptocurrency transactions, etc. Hardware 40 may also comprise display 52 and input interface 54. Display 52 may be configured to display information associated with system 10 (e.g., information associated with security system base station 23, cryptocurrency security, user prompts, notifications, etc.). any one of display 52 and input interface 54 may refer to interface devices 21. Input interface 54 may be configured to receive user input and may comprise one or more input components such as buttons or keys. In a nonlimiting example, display 52 may be a display of a security system keypad, and input interface may include one or more keys of the security system keypad. In one nonlimiting example, display 52 may prompt a user to enter a personal identification number (PIN) (or any other number, or any other characters) or a command (e.g., lock wallet request, unlock wallet request) using input interface 54.

Mobile device 18 of system 10 includes hardware 80 that further includes processing circuitry 82. The processing circuitry 82 may include a processor 84 and a memory 86. In particular, in addition to or instead of a processor, such as a central processing unit, and memory, the processing circuitry 82 may comprise integrated circuitry for processing and/or control, e.g., one or more processors and/or processor cores and/or field programmable gate arrays (FPGAs), application specific integrated circuits (ASICs) and/or microcontroller adapted to execute instructions. The processor 84 may be configured to access (e.g., write to and/or read from) the memory 86, which may comprise any kind of volatile and/or nonvolatile memory, e.g., cache and/or buffer memory and/or random access memory (RAM), read-only memory (ROM) and/or optical memory and/or erasable programmable read-only memory (EPROM).

Thus, the mobile device 18 further has software 100 stored internally in, for example, memory 86, or stored in external memory (e.g., database, storage array, network storage device, etc.) accessible by the mobile device 18 via an external connection. The software 100 may be executable by the processing circuitry 82. The processing circuitry 82 may be configured to control any of the methods and/or processes described herein and/or to cause such methods, and/or processes to be performed, e.g., by mobile device 18. Processor 84 corresponds to one or more processors 84 for performing mobile device 18 functions described herein. The memory 86 is configured to store data, programmatic software code and/or other information described herein. In some embodiments, the software 100 may include instructions that, when executed by the processor 84 and/or processing circuitry 82, causes the processor 84 and/or processing circuitry 82 to perform the processes described herein with respect to mobile device 18.

Further, hardware 80 may comprise communication interface 70 configured to establish, maintain, or terminate communication with any component of system 10 (e.g., cryptocurrency management device 16, security system base station 23, etc.). Communication interface 70 may be configured to support any communication protocol, use private communication links, semi-private communication links, and public communication links.

Hardware 80 may comprise mobile device wallet unit 88 which may be configured to perform any step and/or task and/or process and/or method and/or feature described in the present disclosure, e.g., provide, maintain, or terminate access to a cryptocurrency wallet, perform one or more steps associated with a cryptocurrency wallet function, perform one or more steps associated with communication with security system base station 23, perform one or more steps for verification of a user associated with a cryptocurrency wallet, cryptocurrency management device 16, mobile device 18, security system base station 23, or any other component of system 10.

Figure 3:
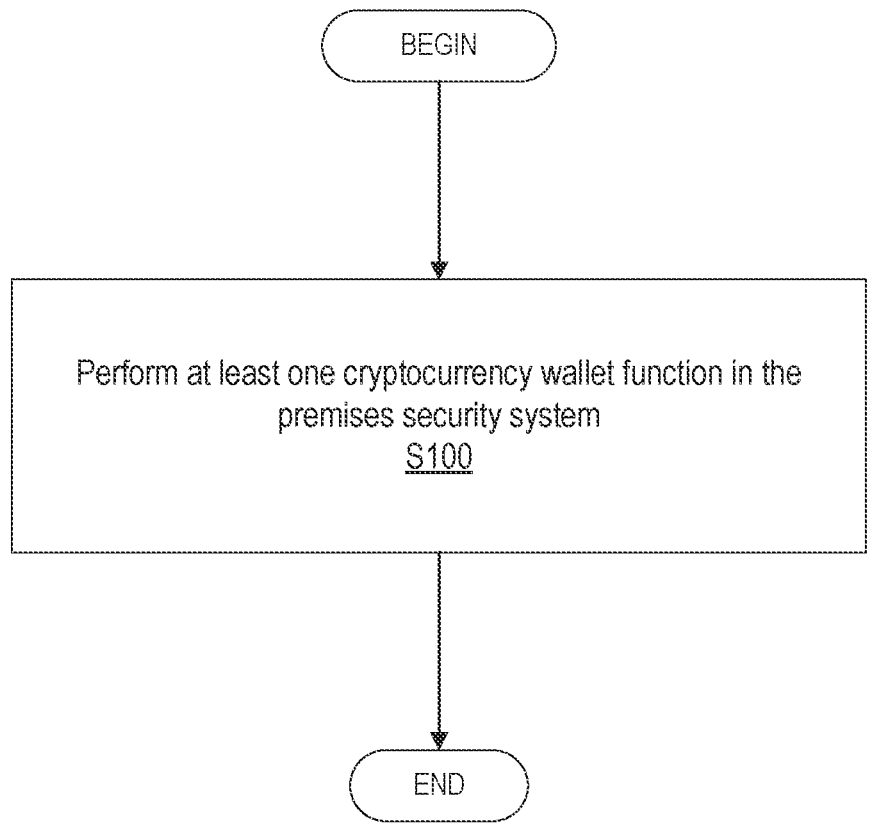
FIG. 3 is a flowchart of an example process for providing a cryptocurrency wallet in a security system in accordance with some embodiments.

FIG. 3 is a flowchart of an example process associated with a cryptocurrency wallet in a security system base station 23 of a premises security system 12 in accordance with some embodiments. One or more blocks described herein may be performed by one or more elements of cryptocurrency management device 16, such as by one or more of processing circuitry 25 and/or processors 26, 27 and/or communication interface 34 and/or by one or more elements of security system base station 23 such as processing circuitry 42. Cryptocurrency management device 16 such as via processing circuitry 25 and/or communication interface 34 is configured to perform (Block S100) at least one cryptocurrency wallet function in the premises security system 12. In one or more embodiments, a cryptocurrency wallet action may include one or more of: provide access to the cryptocurrency wallet, receive cryptocurrency, transfer cryptocurrency, lock the cryptocurrency wallet, among other cryptocurrency based functions described herein.

According to one or more embodiments, the processing circuitry 25 further comprises a first microcontroller that contains a bootloader which only executes signed firmware that is stored in a separate encrypted storage, different from firmware storage for the security system base station 23 of the premises security system 12, the separate encrypted storage containing private keys needed to interact with the cryptocurrency wallet. According to one or more embodiments, a secret key is stored in a second microcontroller, a secret key stored in the first microcontroller, a user's secret PIN is stored, and the cryptocurrency wallet's recovery passwords are stored.

According to one or more embodiments, a storage interface 35 (e.g., a removable card interface) that allows for storing and backing up of recovery passwords is described. According to one or more embodiments, processing circuitry 38 is configured to continuously monitor the security system base station enclosure for signs of tampering and notify a security provider and customer if the enclosure is forcibly opened or breached. According to one or more embodiments, processing circuitry 25 is configured to, when the security system base station 23 detects tampering, send a signal to the second microcontroller which instructs the second microcontroller to factory reset its secret key and factory reset the secret key on the first microcontroller.

According to one or more embodiments, processing circuitry 42 or communication interface 50 is configured to use encrypted communications over a private cellular access point name (APN) for communications between the cryptocurrency wallet and an internet blockchain. According to one or more embodiments, an application on a mobile device 18 is configured such that financial cryptocurrency transactions from the mobile application are required to be performed in physical proximity to the cryptocurrency wallet in the security system base station 23 and such that the mobile application communicates directly (or indirectly via security system base station 23) with the cryptocurrency wallet locally, not over the internet, and sends messages to the cryptocurrency wallet to send cryptocurrency to a specified cryptocurrency wallet. According to one or more embodiments, a display 52 and an input interface 54 such as keypad on the security system base station 23 and processing circuitry 42 are further configured to, when sending or receiving cryptocurrency, display at least one of a wallet address, amount of cryptocurrency, status and confirmation for a transaction on the display.

Figure 4:
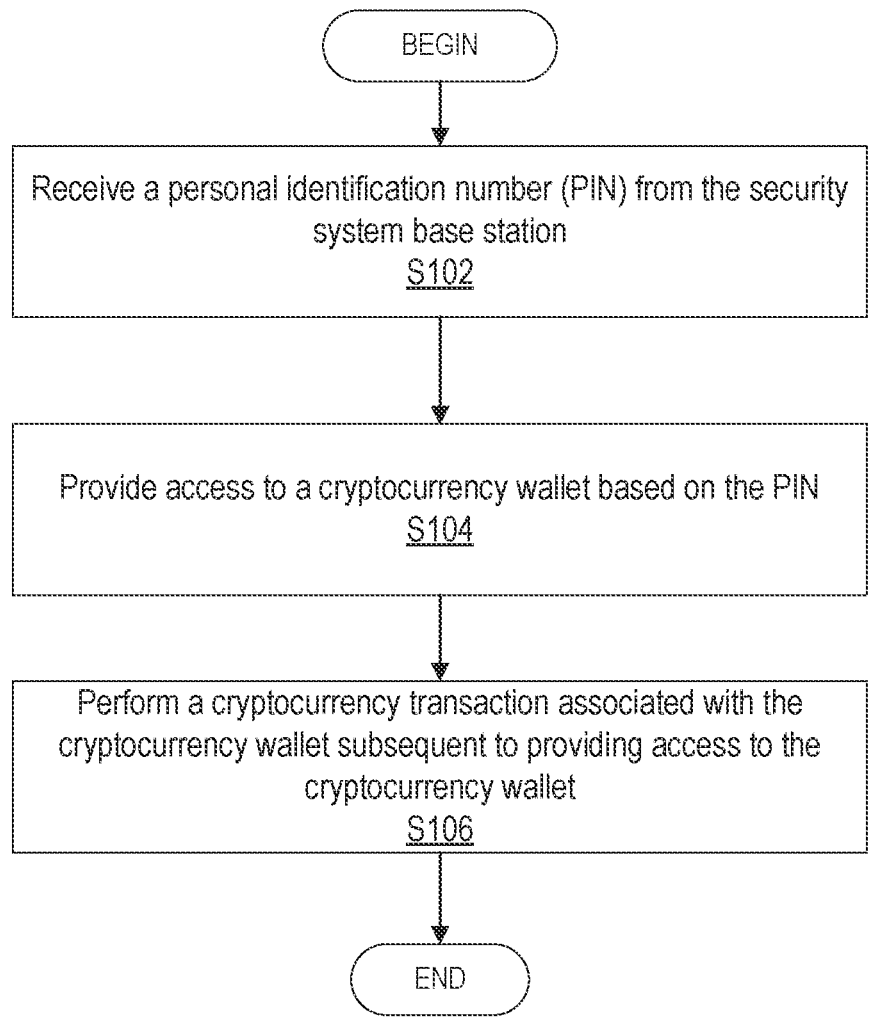
FIG. 4 is a flowchart of another example process for providing a cryptocurrency wallet in a security system in accordance with some embodiments.

FIG. 4 is a flowchart of an example process implemented in cryptocurrency management device 16 in accordance with some embodiments. One or more blocks described herein may be performed by one or more elements of cryptocurrency management device 16 such as by one or more of processing circuitry 25 and/or processors 26, 27 and/or communication interface 34. Cryptocurrency management device 16 is configured to receive (Block S102) a personal identification number (PIN) from the security system base station; provide (Block S104) access to a cryptocurrency wallet based on the PIN; and perform (Block S106) a cryptocurrency transaction associated with the cryptocurrency wallet subsequent to providing access to the cryptocurrency wallet.

In some embodiments, the cryptocurrency management device 16 further comprises a first memory 29, and the method further comprises comparing the PIN with an additional PIN stored in the first memory 29; and providing access to the cryptocurrency wallet further in response to determining that the PIN matches the additional PIN.

In some other embodiments, the method further comprises determining that the PIN matches the additional PIN; and in response to determining that the pin matches the additional PIN, decrypting a private key stored in the first memory 29, the decrypted private key being useable to facilitate the crypto currency transaction.

In one embodiment, the method further comprises detecting that the security system base station 23 has been tampered with; and in response to detecting that the security system base station 23 has been tampered with, resetting the private key to a factory reset state.

In another embodiment, the method further comprises receiving, from the security system base station 23, a request to provide access to the cryptocurrency wallet; and providing access to the cryptocurrency wallet further based on the request.

In some embodiments, the cryptocurrency management device 16 is further configurable to communicate with a mobile device 18 via the security system base station 23 and pair with the mobile device 18 using a random number.

In some other embodiments, the method further comprises performing the cryptocurrency transaction based further on a user input on the mobile device 18.

In an embodiment, the method further comprises determining that a device failed to pair with the security system base station 23; and in response to determining that the device failed to pair with the security system base station 23, terminating access to the cryptocurrency wallet.

In another embodiment, the method further comprises decrypting a wallet application from wallet firmware based on a public key and a signature; and executing the decrypted wallet application in an isolated trusted execution environment to perform the cryptocurrency transaction.

In some embodiments, the security system base station 23 is configured to communicate with a blockchain network via a private network, and the method further comprises transmitting a message associated with the cryptocurrency transaction to the blockchain network via the private network.

Having described the general process flow of arrangements of the disclosure and having provided examples of hardware and software arrangements for implementing the processes and functions of the disclosure, the sections below provide details and examples of arrangements for a premises security system 12 comprising secure embedded cryptocurrency storage (i.e., cryptocurrency wallet, cryptocurrency management device 16).

Some embodiments include a premises security system 12 with an embedded cryptocurrency wallet (i.e., cryptocurrency management device 16). The premises security system 12 may have a security system base station 23 that includes a cryptocurrency management device 16 (e.g., a hardware cryptocurrency wallet module) as illustrated in FIG. 5.

Figure 5:
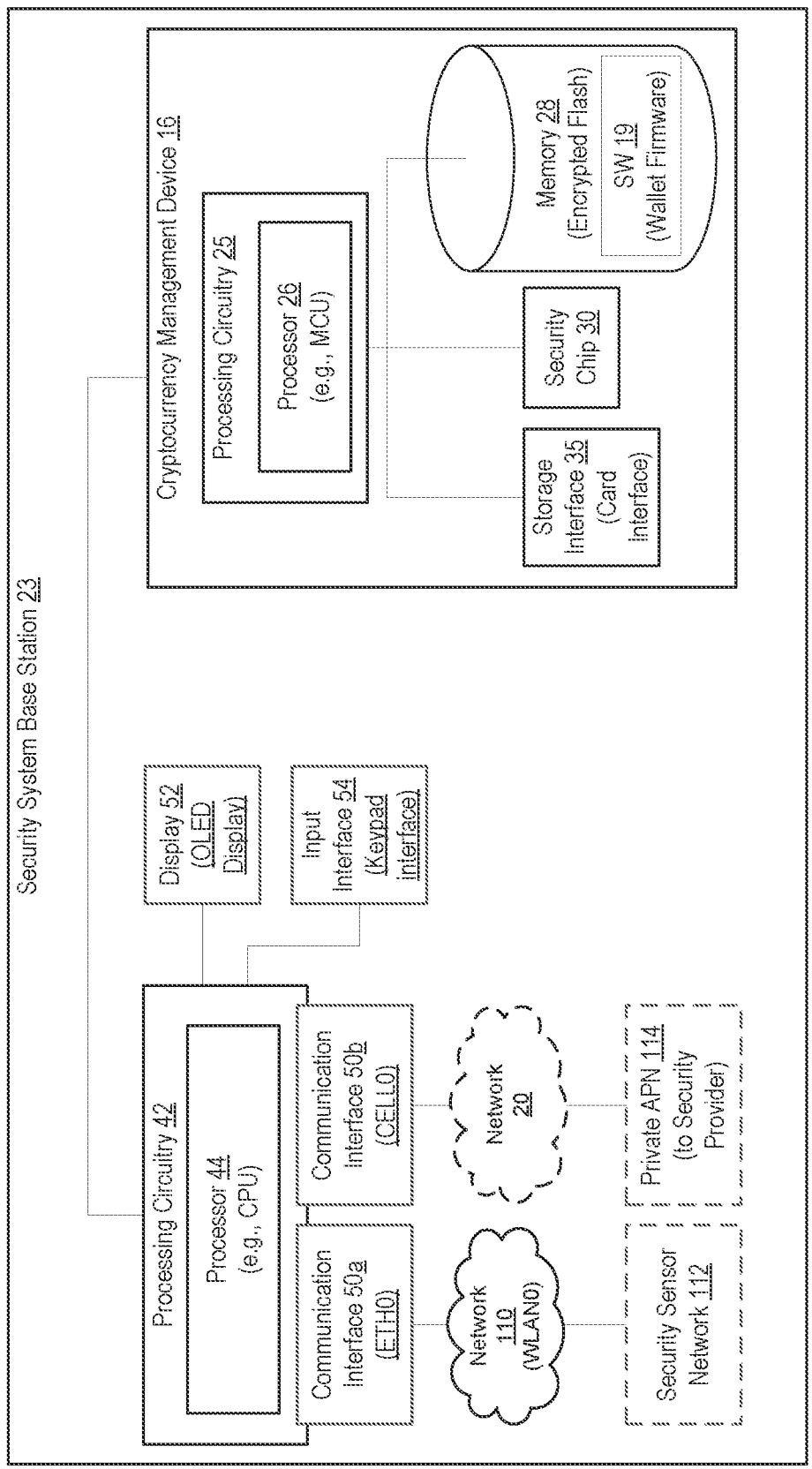
FIG. 5 is a security system architecture diagram an example security system base station with an embedded cryptocurrency wallet in accordance with some embodiments.

More specifically, FIG. 5 shows an example security system base station 23 comprising cryptocurrency management device 16. Cryptocurrency management device 16 comprises processing circuitry 25 and processor 26. Any one of processing circuitry 25 and processor 26 may be referred to as a microcontroller (MCU). Cryptocurrency management device 16 further comprises memory 28, security chip 30, and storage interface 35. Memory 28 may be encrypted flash memory comprising software 19 such as wallet firmware.

Cryptocurrency management device 16 may be in communication with processing circuitry 42 comprised in security system base station 23. Processing circuitry 42 may comprise processor 44, any one of which may refer to a CPU. Security system base station 23 may further comprise communication interface 50a which may be configured to communicate with a security sensor network 112, such as via network 110. Communication interface 50a may be configured to support ethernet protocols, wireless protocols, or any other communication protocol. Further, communication interface 50b may be configured to communicate to a security provider via a private APN 114 and via network 20. Communication interface 50b may be configured to support cellular protocols or any other communication protocol. In addition, security system base station 23 may include display 52 (e.g., OLED display) and input interface 54 (e.g., keypad interface).

Figure 6:
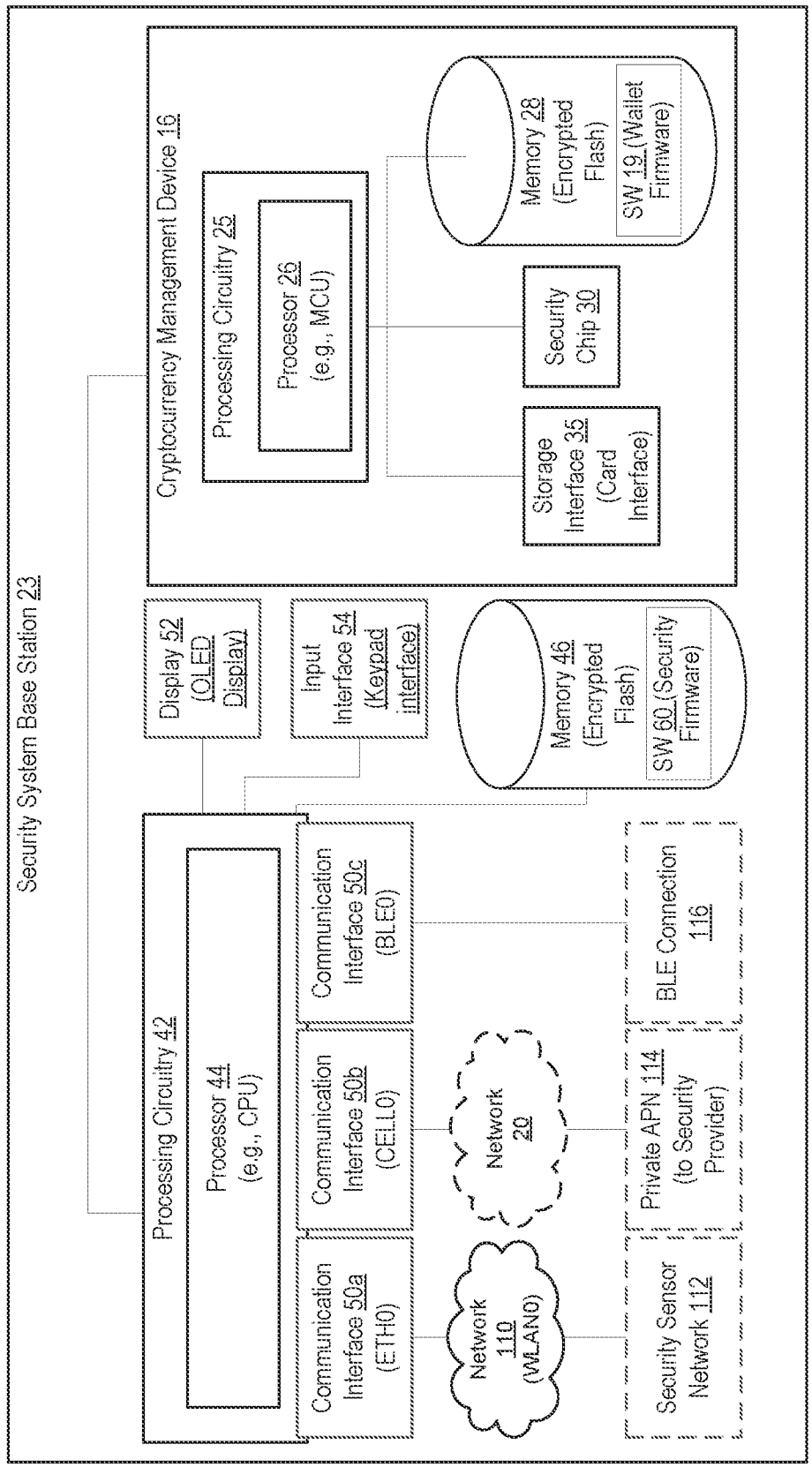
FIG. 6 is a security system architecture diagram another example security system base station with an embedded cryptocurrency wallet in accordance with some embodiments.

FIG. 6 shows an example security system base station 23, similar to FIG. 5. Security system bases station 23 of FIG. 23 may further comprise communication interface 50c configured to communicate with any device (e.g., mobile device 18) or any other device (e.g., sensor) using a connection such as Bluetooth Low Energy (BLE) connection 116. Communication interface 50c may be configured to support any Bluetooth protocol or any other communication protocol. In addition, security system bases station 23 may comprise memory 46 such as encrypted flash that may be configured to store software 60 such as security firmware. Security firmware may include firmware executable to perform one or more functions associated with security system base station 23 (e.g., providing premises security).

In some embodiments, the cryptocurrency management device 16 may comprise processing circuitry 25 and processor 26 (e.g., an MCU) which may be configured to controls cryptocurrency wallet functions and communications with the input interface 54 (e.g., keypad interface) of security system base station 23, one or more networks such as the internet, and display 52 (e.g., organic light-emitting diode (OLED) display. A security chip 30 (e.g., such as separate processing circuitry or secure party of processing circuitry 25 or microcontroller) may comprise a bootloader which only executes firmware signed by a trusted entity, such as the security company. Software 19 such as firmware (e.g., wallet firmware) may be stored in memory 28 such as a separate encrypted storage. Memory 28 may be different from the firmware storage for the security system base station 23 (i.e., memory 46). Memory 28 may be encrypted flash storage and comprise the private keys used to interact with the cryptocurrency wallet. Private keys may also be stored in memory 29 of security chip 30.

In one or more embodiments, one or more (e.g., four) distinct secrets, passwords, or authentication actions are used or performed to interact with the cryptocurrency wallet: 1) a secret key in the microcontroller (e.g., processing circuitry 25, processor 26, or memory 28); 2) a secret key in the security chip 30 (e.g., memory 29, different part of memory 28 or different memory 28 entity, etc.); 3) the user's secret PIN (e.g., as entered in input interface 54); and 4) the user's private key for the cryptocurrency wallet (e.g., blockchain wallet). Processing circuitry 25, 42 and/or processor 26, 44 may comprise trusted platform modules configurable to create secure enclaves for storing secrets (e.g., keys) and/or establish a root of trust. Further, recovery words can be used to recreate a private key. The recovery words and private key can be backed up to external storage such as a secure digital (SD) card, which can be removable, thereby allowing the recovery words and private key to be stored offline. An SD card interface may be configurable to communicate with one or more components for transferring, storing and backing up the recovery words, passwords, codes, etc. This allows customers to make multiple backup copies of the recovery words on different SD cards and store them in secure locations.

In some embodiments, the microcontroller (i.e., processing circuitry 25, processor 26) of implements a TEE which provides hardware isolation and protections for the Security and Cryptocurrency applications. In some other embodiments, the TEE only accepts code for execution that has been authorized by a Security Provider. In some embodiments, security chip 30 is a System on a Chip (SoC) configured for providing security for the cryptocurrency hardware wallet. Security chip 30 may have its own RAM (i.e., memory 29) and be configured to perform security operations independent of other processors and/or processing circuitry (e.g., the microcontroller of the security system base station 23 or of the cryptocurrency management device 16). Security chip 30 may be configured to generate random numbers, with an internal hardware-based random number generator, generate encrypted keys, with an internal hardware-based crypto engine, store encrypted keys, perform public and private key operations such as elliptic-curve cryptography, or be involved in a secure boot sequence. Random numbers may be used by cryptographic processes (e.g., via processing circuitry 25 or any other processing circuitry) and/or used for generating nonces (e.g., random or semi-random numbers generated for a specific use) and/or for creating new public and private keys.

In one or more embodiments, firmware (i.e., software 19, software 60, etc.) is encrypted using a device unique key, e.g., a binding secret symmetric key (BSSK). In some embodiments, when the security system base station 23 boots, a bootloader uses the BSSK to decrypt the runtime firmware and start the security and cryptocurrency applications. The BSSK may be stored in the security chip 30.

In an embodiments, one or more PINs (e.g., secret PINs) may be used. Users may have two secret PINs: one for interacting with the security system, and one for interacting with the cryptocurrency wallet (i.e., cryptocurrency management device 16). The user's secret PIN can be the same PIN as used to arm and disarm their security system (i.e., premises security system 12). However, the PINs do not need to be the same. A user may have different PINs for the premises security system 12 (e.g., for security alarms) and for cryptocurrency transactions.

The PIN may be used as a password for interacting with the cryptocurrency wallet (i.e., cryptocurrency management device). The PIN may be entered into the keypad (i.e., input interface 54) or capacitive touch display (i.e., display 52) of the security system base station 23. In some embodiments, the PIN is never communicated over the internet or stored by the security provider. The PIN may be hashed, and the hash of the PIN may be stored on the security chip 30. In one or more embodiments, when a user enters their PIN, it is first hashed and compared to the saved hash of the stored PIN (e.g., in security chip 30) to verify if it matches or not.

In some embodiments, to unlock the cryptocurrency wallet (i.e., access wall functions such as transactions and information associated with the cryptocurrency wallet), the user may use the input interface 54 (e.g., keypad) to enter their secret PIN, which may comprise one or more (e.g., 6 to 15) alpha numeric digits in a predetermined format or numbering system (e.g., in hexadecimal (0-9A-F)). The user may press one button (e.g., unlock wallet button) of input interface 54 to request access to the cryptocurrency wallet (e.g., unlock the wallet).

In one or more embodiments, a private key may be used. Cryptocurrency transactions on a blockchain rely on public key infrastructure (PKI). The public key defines the address of the cryptocurrency wallet and is used when sending cryptocurrency to the cryptocurrency wallet. A private key is used to verify transactions and prove ownership of a blockchain address (e.g., cryptocurrency wallet).

In some embodiments, a cryptocurrency wallet may be created. During the initial creation of a cryptocurrency wallet, a blockchain address, recovery words, and private key are generated. The private key may be a 256-bit number that corresponds to the user's public key which is the user's blockchain address. This private key may be stored on the security chip. The public and private keys may have one or more formats.

In some other embodiments, if the private key is lost or corrupted, it can be re-generated using one or more (e.g., 24) recovery words and the secret PIN. The algorithm for converting the recovery words to a private key may include using a Password Based Key Derivation Function 2 (PBKDF2) function with a mnemonic sentence (in Unicode Transformation Format 8 (UTF-8) Normalization Form Compatibility Decomposition (NFKD)) used as the password and the string "mnemonic"+passphrase (again in UTF-8 NFKD) used as a "salt." The iteration count may be set to a predetermined number (e.g., 2048), and Hash-Based Message Authentication Codes Secure Hash Algorithm 512 (MAC-SHA512) may be used as the pseudo-random function.

In some embodiments, a storage interface 35 (e.g., an SD card interface) allows for storing and backing up the user's private key. This allows users to make multiple backup copies of the private key on different removable cards (i.e., memory 36) such as SD cards and store the removable cards in secure locations. The user can choose to encrypt the private key using the secret PIN.

Figure 7:
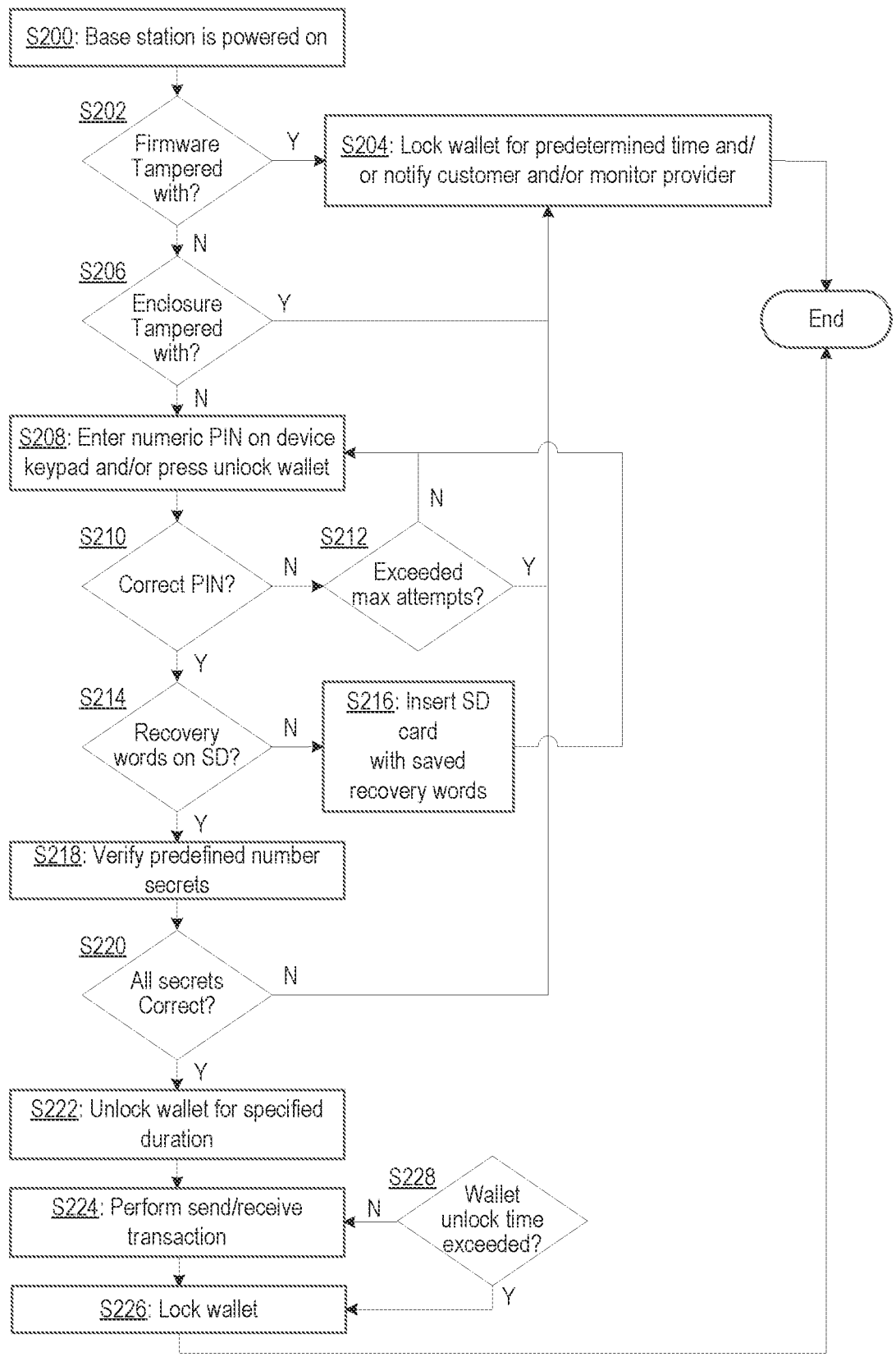
FIG. 7 is an illustration of an example process comprising security checks that take place to verify and unlock a cryptocurrency wallet in accordance with some embodiments.

FIG. 7 is an illustration of an example process (i.e., method) to verify and unlock (i.e., provide access to) a cryptocurrency wallet in accordance with some embodiments. Any of the steps of FIG. 7 may be performed by, for example, one or more of cryptocurrency management device 16 (including processing circuitry 25), security system base station 23 (including processing circuitry 42), etc. At step S200, security system base station 23 is powered on. At step 202, whether firmware has been tampered with is determined. If the firmware has been tampered with, at step S204, the method comprises locking the wallet (i.e., removing or blocking access to the cryptocurrency wallet or wallet functions performed by cryptocurrency management device 16). If the firmware has not been tampered with, at step S204, the method comprises determining whether an enclosure (e.g., an enclosure associated with the system 10 such as a premises security system enclosure) has been tampered with. If the enclosure has been tampered with, at step S204, the method comprises locking the wallet (i.e., removing or blocking access to the cryptocurrency wallet or wallet functions performed by cryptocurrency management device 16). If the enclosure has not been tampered with, at step S204, the method comprises entering a PIN on device keypad (i.e., input interface 54) and/or press unlock wallet button on the device keypad. At step S210, the method comprises determining whether the PIN is a correct PIN. At step S212, if a maximum number of attempts (i.e., to enter the PIN) is exceeded, the method performs step S204. if the maximum number of attempts (i.e., to enter the PIN) is not exceeded, the method returns to step S208. At step S214, the method comprises determining whether recovery words can be found in memory 37 (e.g., SD card). If recovery words cannot be found in memory 37, memory 37 including saved recovery words is inserted in storage interface 35, and the method is returned to step S204. If recovery words can be found in memory 37, step 218 is performed which includes verifying predefined number secrets. If all secrets are determined not to be correct at step S220, the method performs step S204. If all secrets are correct, at step S222, the wallet is unlocked for a specified duration. At step S224, send or receive transactions are performed (e.g., cryptocurrency transactions are performed including sending or receiving cryptocurrency to or from the cryptocurrency wallet). At step S226, the wallet is locked. Further, at step 228, the method comprises determining whether a wallet unlock time has been exceeded. If not exceeded, step S224 is performed. If exceeded, step S226 is performed.

Figure 8:
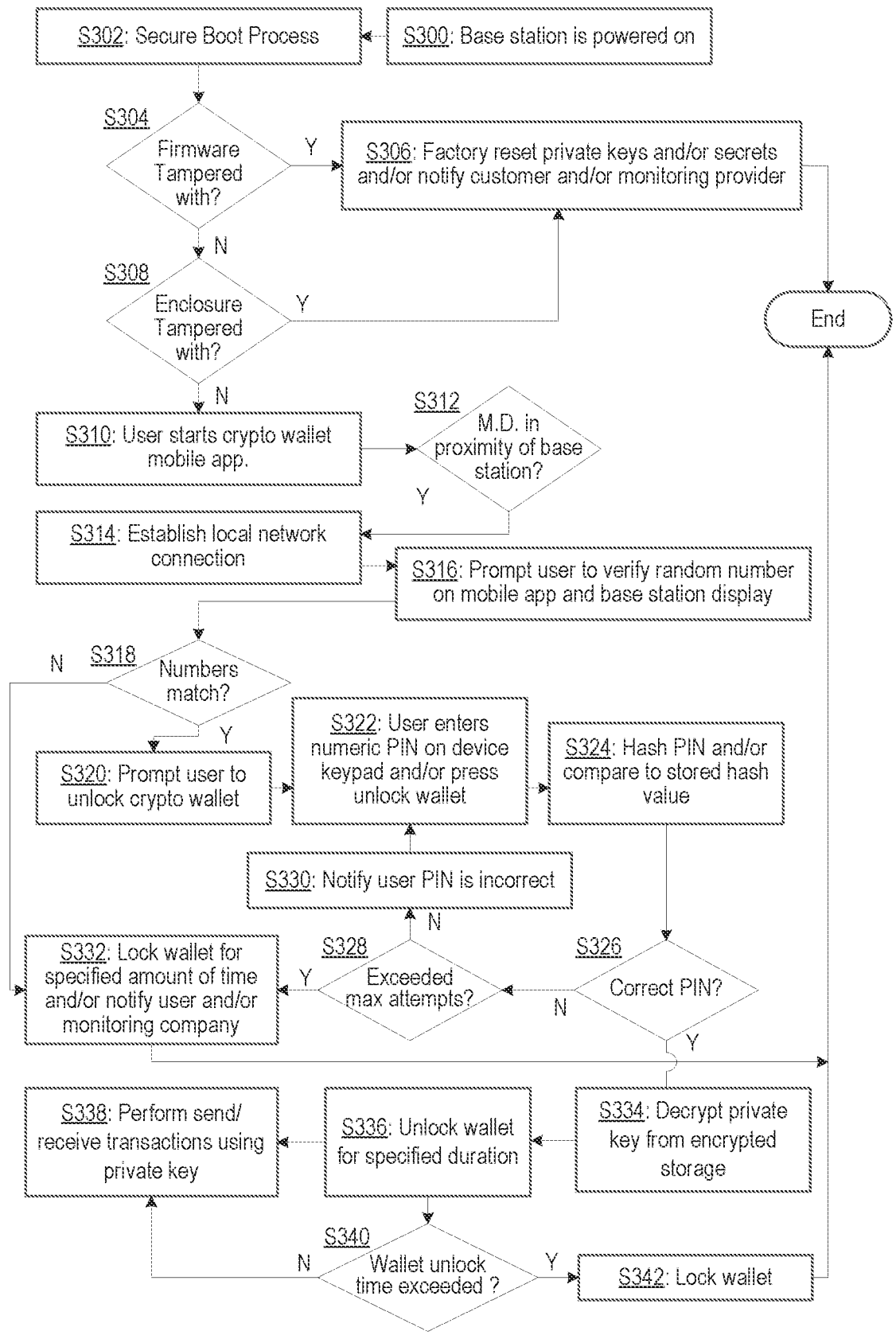
FIG. 8 is an illustration of another example process comprising security checks that take place to verify and unlock a cryptocurrency wallet in accordance with some embodiments.

FIG. 8 is an illustration of another example process (i.e., method) to verify and unlock (i.e., provide access to) a cryptocurrency wallet in accordance with some embodiments. Any of the steps of FIG. 8 may be performed by, for example, one or more of cryptocurrency management device 16 (including processing circuitry 25), mobile device 18 (including processing circuitry 82), security system base station 23 (including processing circuitry 42), etc.

At step S300, security system base station 23 is powered on. At step 302, a secure boot process is performed. At step S304, whether firmware has been tampered with is determined. If the firmware (e.g., wallet firmware, security firmware) has been tampered with, at step S306, the method comprises locking factory resetting private keys and/or secrets and/or notifying customer and/or monitoring provider. If the firmware has not been tampered with, at step S308, the method comprises determining whether an enclosure (e.g., an enclosure associated with the system 10 such as a premises security system enclosure) has been tampered with. If the enclosure has been tampered with, the method comprises performing step S306. If the enclosure has not been tampered with, at step S310, the method comprises starting a cryptocurrency wallet mobile application such as software 100 on mobile device 18. At step S312, whether the mobile device (MD) 18 is in proximity (i.e., within a predetermined distance) of the security system base station 23. If the mobile device 18 is in proximity, step S314 is performed which includes establishing a local network connection. If the mobile is not in proximity, a message may be display indicating that the mobile device 18 is not in proximity or is not authorized to access the cryptocurrency wallet. At step S316, the user (i.e., of the mobile device 18, trying to access crypto currency wallet) is prompted (e.g., by the mobile device 18, by the security system base station 23) to verify a number (e.g., random number) on the cryptocurrency wallet mobile application and display 52 of the security system base station 23.

At step S318, if the number is the same on both, on the cryptocurrency wallet mobile application and display 52 of the security system base station 23, step S320 is performed, which includes prompting the user (e.g., on display 52, mobile device 18) to unlock the cryptocurrency wallet. If the number is not the same on both, on the cryptocurrency wallet mobile application and display 52 of the security system base station 23, step S332 is performed, which includes locking the cryptocurrency wallet for a specified amount of time and/or notifying a user and/or monitoring company. At step S322, the user enters a PIN (e.g., numeric PIN, alphanumeric PIN) on input interface 54 (e.g., keypad interface) and/or presses a button (i.e., unlock wallet button). At step S324, the entered PIN is hashed and/or compared to a stored hash value (i.e., a hashed PIN stored in a memory of cryptocurrency management device 16. At step 326, whether the entered PIN is correct (e.g., hashed PIN is the same as the stored hash value) is determined. If the entered PIN is not correct, and the maximum number of attempts (step S328) is not exceeded, the method comprises notifying the user PIN is incorrect, at step S330, and performing step S322. If the maximum number of attempts (step S328) is exceeded, step S332 is performed. If the PIN is correct, the method comprises performing step S334, which comprises decrypting one or more private keys from encrypted storage (e.g., memory 28, memory 29, or memory 36). At step S336, the cryptocurrency wallet is unlocked (i.e., access is provided to the wallet). At step S338, one or more transactions may be performed. The transactions may be cryptocurrency transactions, which may be performed using a private key and may include sending or receiving cryptocurrency. At step S340, the method comprises determining whether a wallet unlock time has been exceeded. If the wallet unlock time has been exceeded, at step S342, the wallet is locked (i.e., access is terminated). If the wallet unlock time has not been exceeded, step S338 may be performed.

In one or more embodiments, the cryptocurrency wallet may automatically lock after a predetermined amount of time (i.e., a wallet unlock time such as 10 minutes). A customer can also press a lock button on the input interface 54 to lock the cryptocurrency wallet prior to the predetermine amount of time elapsing.

In some embodiments, the security system base station 23 enclosure is continuously or periodically monitored for signs of tampering and will notify the security provider, premises security system 12, or a customer in the event that the enclosure is forcibly opened or breached. This may be performed to further increase security and reduce the attack surface. For example, the security system base station 23 may monitor one or more sensors positioned in and/or on security system base station 23 such that one or more sensor readings meeting one or more thresholds may indicate possible tampering. The one or more sensors may include a shock sensor, accelerometer, temperature sensor, pressure sensor, etc. When the security system base station 23 detects tampering, it sends a signal to the MCU (e.g., processing circuitry 25, processor 26) which instructs the MCU to factory reset its secret key and factory reset the secret key on the security chip 30 comprised in cryptocurrency management device 16. This way, if the other two secrets (e.g., security mechanism) are compromised, a user cannot physically steal the MCU and security chip and have possession of all (e.g., 4) secrets (or a predefined amount of verification data) to gain access to the cryptocurrency wallet.

In one or more embodiments, a triggered alarm at the premises security system 12 may trigger one or more actions by the cryptocurrency management device 16. For example, a triggered fire or flooding alarm at the premises security system 12 may cause cryptocurrency management device 16 and/or security system base station 23 to initiate the transfer of the cryptocurrency wallet to a predefined off-site location or to a predefined server or predefined cloud network system, etc. Therefore, if a fire or flood that triggered the fire or flood alarm destroys the cryptocurrency management device 16, there is a copy that was automatically transferred to a safe and off-site location. Further, an intrusion alarm at the premises security system 12, the cryptocurrency management device 16 may perform one or more actions such as sending a signal to the MCU (e.g., processing circuitry 25, processor 26) which instructs the MCU to factory reset its secret key and factory reset the secret key on the security chip 30 comprised in cryptocurrency management device 16. In other words, in one or more embodiments, specific alarms triggered by the premises security system 12 may trigger specific actions by the cryptocurrency management device 16.

In one or more embodiments, motion detected by one or more premises devices 22 while the premises security system 12 is armed may cause the premises security system 12 to determine whether the motion is proximate the cryptocurrency management device 16. If the motion is proximate the cryptocurrency management device 16, the premises security system 12 may indicate or cause the cryptocurrency management device 16 to perform one or more actions such as: lock and/or secure the cryptocurrency wallet, and/or send a signal to the MCU (e.g., processing circuitry 25, processor 26) which instructs the MCU to factory reset its secret key and factory reset the secret key on the security chip 30 comprised in cryptocurrency management device 16, among other actions. In other words, premises devices 22 that are used to monitor a premises may trigger one or more actions by cryptocurrency management device 16.

In some embodiments, after unlocking the cryptocurrency wallet, communication between the cryptocurrency wallet and the internet blockchain (e.g., internet, blockchain network) may use encrypted communications over a private cellular APN via cell communication interface 50b (e.g., CELL0) of FIGS. 5 and 6, and do not use the Customer's Wi-Fi or broadband internet, i.e., does not use communication interface 50a (i.e., ethernet link ETH0). The private cellular APN may be the same private cellular APN as used by a security company associated with premises security system 12 such as for life safety and security monitoring.

Figure 9:
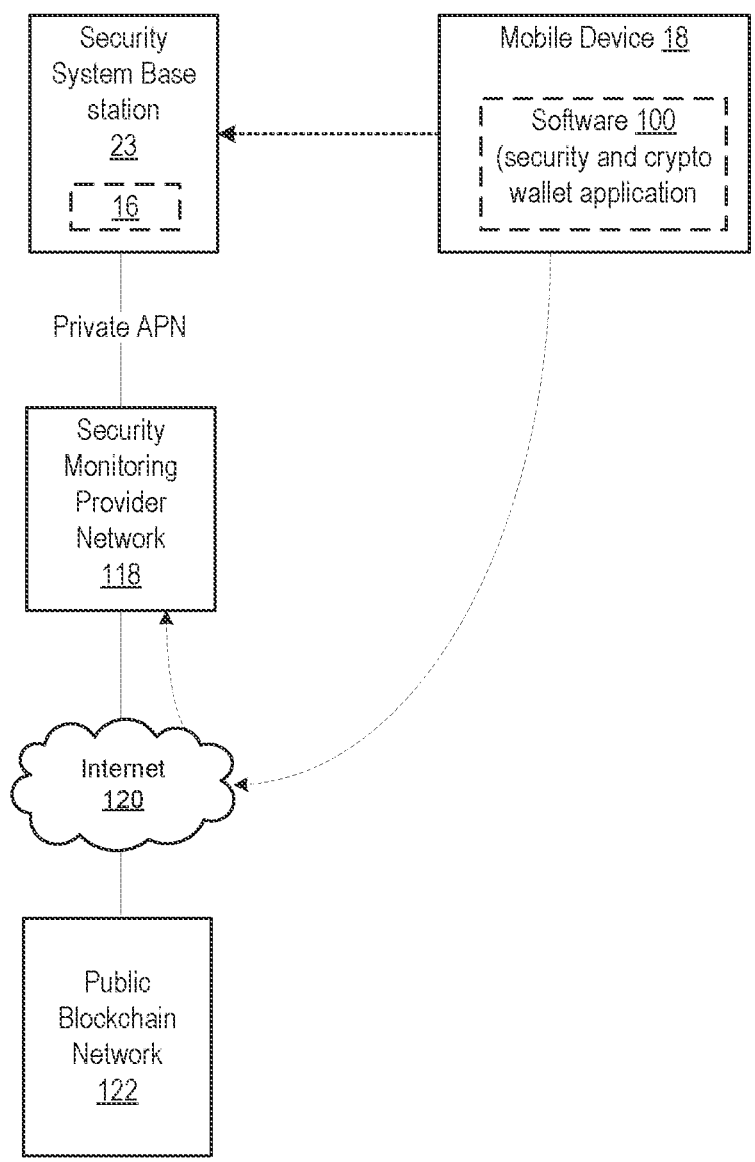
FIG. 9 is an illustration of an example communications diagram between mobile device software, a security system base station, and public blockchain on the internet in accordance with some embodiments.
Figure 9:
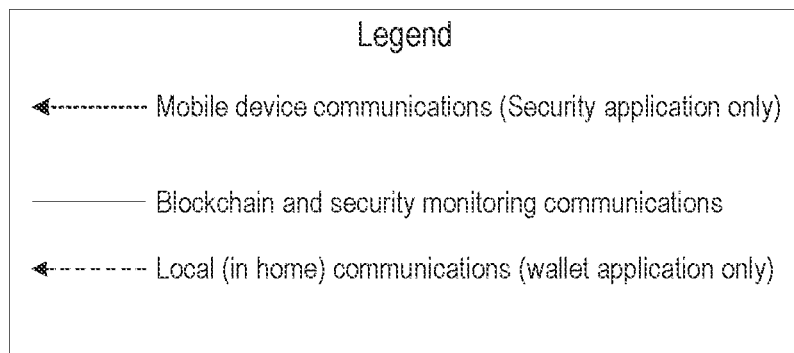

In one or more embodiments, cryptocurrency transactions are initiated through the security provider's mobile application or a certified cryptocurrency application approved by the security provider, after unlocking the cryptocurrency wallet. FIG. 9 illustrates an example communications diagram between software 100 (e.g., a security and cryptocurrency mobile application), security system base station 23, and public blockchain (e.g., public blockchain network 122) on the internet 120 in accordance with some embodiments. In one or more embodiments, financial cryptocurrency transactions from software 100 may need to be performed in physical proximity to the cryptocurrency wallet, i.e., cryptocurrency management device 16, in the security system base station 23. Software 100 communicates directly with the cryptocurrency wallet module (i.e., cryptocurrency management device 16) locally, not over the internet, and sends messages to the cryptocurrency wallet to send cryptocurrency to a specified wallet, another location, and/or another electronic address. The cryptocurrency management device 16 performs the transaction using the private APN which is routed through the security provider network 118 to the public blockchain (e.g., public blockchain network 122) on the internet. This may be performed to further reduce the attack surface and protect against man-in-the-middle attacks.

In some embodiments, the local communications method between the security system base station 23 and software 100 can be over Bluetooth LE or a local network connection over WiFi. The security system base station 23 may be configured to announce its service over the local network using multicast domain name server (mDNS). When software 100 (e.g., security provider's mobile application, or a certified cryptocurrency application) is on the same local network, software 100 may automatically discover the security system base station 23 and may initiate a secure pairing process. Alternatively, software 100 can be configured to pair with the security system base station 23 using Bluetooth LE. In some embodiments, all communications between software 100 and the security system base station 23 are encrypted and use Noise Protocol Framework.

In one or more embodiments, security system base station 23 may be configured to expose an endpoint over the local network for pairing with software 100. During the pairing process a number is displayed on both mobile device 18 (e.g., software 100) and the security system base station 23 (e.g., display 52). The user may be asked to confirm the numbers match. This may be used to confirm software 100, software 19 (e.g., the wallet firmware), or software 60 (e.g., security firmware) has not been tampered with and to minimize or prevent man-in-the-middle attacks. After verifying the numbers match, the user is prompted to enter their PIN (e.g., secret PIN) to unlock the cryptocurrency wallet. In an embodiment, until the cryptocurrency wallet has been successfully unlocked, all application programming interface (API) requests over the local network interface are blocked.

In some embodiments, software 100 does not have access to any of the secrets or private keys. Software 100 may act as a proxied display for relaying commands to the wallet firmware (i.e., software 19). In some other embodiments, A wallet application associated with the wallet firmware may be configured to run in a trusted execution environment (TEE), performs all cryptocurrency commands itself, or sends status related information back to software 100 to display. In an embodiment, all cryptocurrency transactions originate from the wallet application and do not use any connection (e.g., of the mobile device 18) to the internet. That is, in some embodiments, the mobile device 18 never interacts with the blockchain (i.e., public blockchain network 122)

Figure 10:
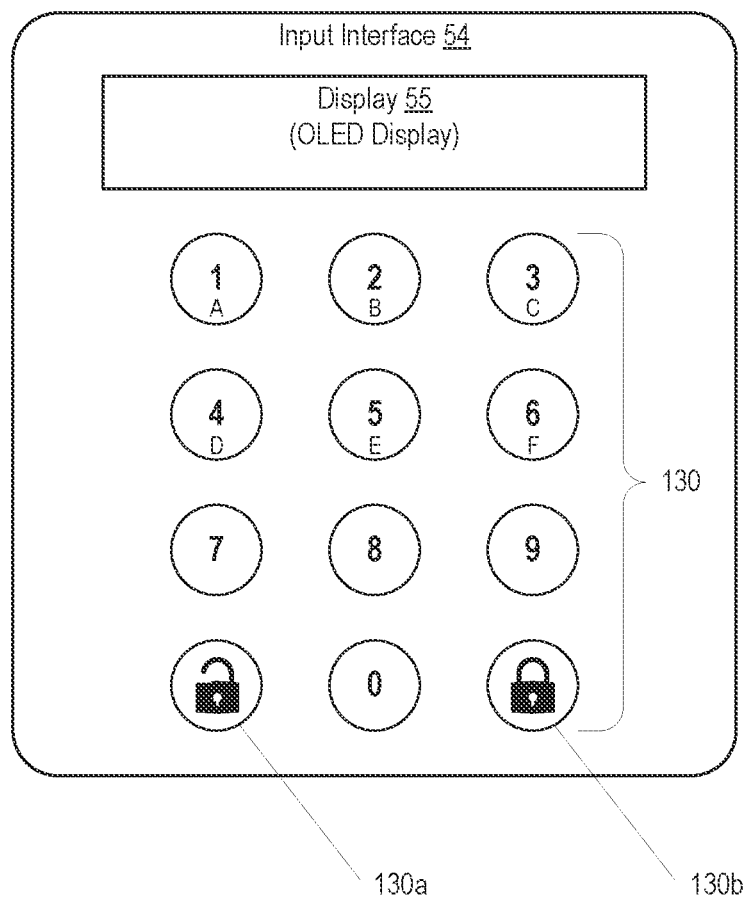
FIG. 10 is an illustration of an example input interface (keypad) and display on a security system base station in accordance with some embodiments.

FIG. 10 illustrates an example input interface 54 (i.e., keypad) and display 55 on a security system base station 23. Input interface may comprise one or more input components 130 (e.g., keypad buttons, input buttons, keys), each of which may comprise and correspond to an alphanumeric value (e.g., 0-9 and A-F) usable to enter a hexadecimal PIN. Further, input components 130 may correspond to an unlock request (e.g., 130a) such as to request unlocking of the wallet and lock request (e.g., 130b) such as to request locking of the wallet. Input components 130a, 130b may be used for disarming and arming premises security system 12. When interacting with cryptocurrency management device (e.g., sending or receiving cryptocurrency), various information may be displayed on the display of display 55. In a nonlimiting example, information displayed may include one or more of a number for paring with mobile device 18, cryptocurrency wallet address, the amount of cryptocurrency, or the status and confirmation of a transaction.

In some embodiments, a secure boot sequence is used. Security system base station 23 may be designed to be always running and rarely be powered off or turned off. In the event of a power failure or a person intentionally unplugging security system base station 23 from a power source, security system base station 23 may be configured to continue to run on battery power and notifies the security monitoring company. This limits the number of times the system is required to go through its boot sequence. A secure boot adds cryptographic checks at each stage of the boot sequence to ensure firmware has not been compromised or maliciously altered. The secure boot process may implement a chain of trust.

In one or more embodiments, a startup sequence of security system base station 23 (or cryptocurrency management device 16) comprises powering the security base station, starting a bootloader, and reading a public key from the read-only memory (ROM) of the microcontroller (e.g., processing circuitry 25, processor 26). The bootloader uses the public key to confirm a signature of the security firmware (e.g., stored in memory 46). If the signature does not match, the system does not boot. If the signature matches, the bootloader starts the trusted security firmware. The trusted security firmware sends a signal to start the start-up application (e.g., software 19) of the cryptocurrency wallet module (i.e., cryptocurrency management device 16). This start-up application runs in an isolated trusted execution environment. The cryptocurrency start-up application (i.e., software 19) reads the public key from the MCU of the cryptocurrency wallet module (i.e., cryptocurrency management device 16)) and verifies the signature matches the public key. If the signature does not match the start-up application reports an error back to the security firmware (e.g., in memory 46), the security firmware may cause security system base station 23 to notify the security monitoring provider, and the cryptocurrency management device 16 factory resets all private data and keys. If the signature matches, the start-up application decrypts and starts a wallet application from the wallet firmware (e.g., stored in memory 28). In addition, the wallet application runs in an isolated trusted execution environment. After successfully starting, a message is sent to the start-up application, and the start-up application terminates execution. Further, the wallet application (e.g., comprised in memory 28) sends a message to a security application (e.g., stored in memory 46) that it has successfully started.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions and/or acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function and/or act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions and/or acts specified in the flowchart and/or block diagram block or blocks.

The functions and/or acts noted in the blocks may occur out of the order noted in the operational illustrations. For example, two blocks shown in succession may in fact be executed substantially concurrently or the blocks may sometimes be executed in the reverse order, depending upon the functionality and/or acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiments are not limited to what has been particularly shown and described herein above. In addition, unless mention was made above to the contrary, it should be noted that all of the accompanying drawings are not to scale. A variety of modifications and variations are possible in light of the above teachings and following claims.

What is claimed is:

1. A security system base station of a premises security system that is configured to monitor a premises, the security system base station comprising:
   first processing circuitry configured to:
      receive a personal identification number (PIN) usable by the first processing circuitry to at least arm or disarm the premises security system;
   a cryptocurrency management device comprising:
      a hardware-based cryptocurrency wallet; and
      second processing circuitry configured to:
         receive, from the first processing circuitry, signaling including the PIN;
         provide access to the hardware-based cryptocurrency wallet based on the PIN; and
         perform a cryptocurrency transaction associated with the hardware-based cryptocurrency wallet subsequent to providing access to the hardware-based cryptocurrency wallet.

2. The security system base station of claim 1, wherein the cryptocurrency management device further comprises a memory in communication with the second processing circuitry, and the second processing circuitry is further configured to:
   compare the PIN with an additional PIN stored in the memory; and
   provide access to the cryptocurrency wallet further in response to determining that the PIN matches the additional PIN.

3. The security system base station of claim 2, wherein the second processing circuitry is further configured to:
   determine that the PIN matches the additional PIN; and
   in response to determining that the PIN matches the additional PIN, decrypt a private key stored in the memory, the decrypted private key being useable to facilitate the cryptocurrency transaction.

4. The security system base station of claim 3, wherein the second processing circuitry is further configured to:
   detect that the security system base station has been tampered with; and in response to detecting that the security system base station has been tampered with, reset the private key to a factory reset state.

5. The security system base station of claim 1, wherein the second processing circuitry is further configured to:
receive, from the first processing circuitry, a request to provide access to the cryptocurrency wallet; and
provide access to the hardware-based cryptocurrency wallet further based on the request.

6. The security system base station of claim 1, wherein the cryptocurrency management device is configurable to communicate with a mobile device via the security system base station and pair with the mobile device using a random number.

7. The security system base station of claim 6, wherein the second processing circuitry is further configured to perform the cryptocurrency transaction based further on a user input on the mobile device.

8. The security system base station of claim 1, wherein the second processing circuitry is further configured to:
determine that a device failed to pair with the security system base station; and
in response to determining that the device failed to pair with the security system base station, terminate access to the cryptocurrency wallet.

9. The security system base station of claim 1, wherein the second processing circuitry is further configured to:
decrypt a wallet application from wallet firmware based on a public key and a signature; and
execute the decrypted wallet application in an isolated trusted execution environment to perform the cryptocurrency transaction.

10. The security system base station of claim 1, wherein the security system base station is configured to communicate with a blockchain network via a private network, and the second processing circuitry is further configured to cause transmission of the security system base station to transmit a message associated with the cryptocurrency transaction to the blockchain network via the private network.

11. A method implemented in a security system base station of a premises security system that is configured to monitor a premises, the security system base station comprising first processing circuitry and a cryptocurrency management device, the cryptocurrency management device comprising a hardware-based cryptocurrency wallet, the method comprising:
receiving, at the first processing circuitry, a personal identification number (PIN) usable by the first processing circuitry to at least arm or disarm the premises security system;
receiving, at the cryptocurrency management device from the first processing circuitry, signaling including the PIN;
providing, by the cryptocurrency management device, access to the hardware-based cryptocurrency wallet based on the PIN; and
performing, by the cryptocurrency management device, a cryptocurrency transaction associated with the hardware-based cryptocurrency wallet subsequent to providing access to the hardware-based cryptocurrency wallet.

12. The method of claim 11, wherein the cryptocurrency management device further comprises a memory, and the method further comprises:
comparing the PIN with an additional PIN stored in the memory; and
providing access to the cryptocurrency wallet further in response to determining that the PIN matches the additional PIN.

13. The method of claim 12, wherein the method further comprises:
determining that the PIN matches the additional PIN; and
in response to determining that the PIN matches the additional PIN, decrypting a private key stored in the memory, the decrypted private key being useable to facilitate the cryptocurrency transaction.

14. The method of claim 13, wherein the method further comprises:
detecting that the security system base station has been tampered with; and
in response to detecting that the security system base station has been tampered with, resetting the private key to a factory reset state.

15. The method of claim 11, wherein the method further comprises:
receiving, at the cryptocurrency management device from the first processing circuitry, a request to provide access to the cryptocurrency wallet; and
providing access to the hardware-based cryptocurrency wallet further based on the request.

16. The method of claim 11, wherein the cryptocurrency management device is configurable to communicate with a mobile device via the security system base station and pair with the mobile device using a random number.

17. The method of claim 16, wherein the method further comprises performing the cryptocurrency transaction based further on a user input on the mobile device.

18. The method of claim 11, wherein the method further comprises:
determining that a device failed to pair with the security system base station; and
in response to determining that the device failed to pair with the security system base station, terminating access to the cryptocurrency wallet.

19. The method of claim 11, wherein the method further comprises:
decrypting a wallet application from wallet firmware based on a public key and a signature; and
executing the decrypted wallet application in an isolated trusted execution environment to perform the cryptocurrency transaction.

20. The method of claim 11, wherein the security system base station is configured to communicate with a blockchain network via a private network, and the method further comprises transmitting a message associated with the cryptocurrency transaction to the blockchain network via the private network.

* * * * *